(12) United States Patent
Schaefer

(10) Patent No.: US 11,359,679 B2
(45) Date of Patent: Jun. 14, 2022

(54) DISK CLUTCH, DISK FOR SUCH A DISK CLUTCH, METHOD FOR PRODUCING SUCH A DISK CLUTCH OR DISK

(71) Applicant: BorgWarner Inc., Auburn Hills, MI (US)

(72) Inventor: Michael Wilhelm Schaefer, Ketsch (DE)

(73) Assignee: BorgWarner Inc., Auburn Hills, MI (US)

( * ) Notice: Subject to any disclaimer, the term of this patent is extended or adjusted under 35 U.S.C. 154(b) by 414 days.

(21) Appl. No.: 16/614,477

(22) PCT Filed: May 17, 2018

(86) PCT No.: PCT/US2018/033180
§ 371 (c)(1),
(2) Date: Nov. 18, 2019

(87) PCT Pub. No.: WO2018/213573
PCT Pub. Date: Nov. 22, 2018

(65) Prior Publication Data
US 2020/0232517 A1 Jul. 23, 2020

(30) Foreign Application Priority Data

May 19, 2017 (DE) .......................... 102017004805.3
Mar. 8, 2018 (DE) .......................... 102018001877.7

(51) Int. Cl.
*F16D 13/64* (2006.01)
*F16D 69/04* (2006.01)

(52) U.S. Cl.
CPC ........ *F16D 13/648* (2013.01); *F16D 69/0408* (2013.01); *F16D 2069/0466* (2013.01);
(Continued)

(58) Field of Classification Search
CPC .................. F16D 2250/0007; F16D 13/648
See application file for complete search history.

(56) References Cited

U.S. PATENT DOCUMENTS 3,048,250 A * 8/1962 Kershner ............... F16D 55/40
192/113.36
4,878,282 A 11/1989 Bauer
(Continued)

FOREIGN PATENT DOCUMENTS

| DE | 102015002310 A1 * | 8/2016 |
| EP | 0305582 B1 | 6/1991 |
| WO | WO2017016555 A1 | 2/2017 |

OTHER PUBLICATIONS

International Search Report of the International Searching Authority for PCT/US2018/033180 dated Nov. 15, 2018.

*Primary Examiner* — Stacey A Fluhart
(74) *Attorney, Agent, or Firm* — Howard & Howard Attorneys PLLC

(57) ABSTRACT

The present invention relates to a disk clutch comprising a first disk set (32) which is connected rotationally fixed to a first disk carrier (18) and a second disk set (42) which is connected rotationally fixed to a second disk carrier (24), wherein the disks (34 through 40, 46 through 52) of the two disk sets (32, 42) may be brought into frictional engagement with one another via friction surfaces (54, 56), wherein recesses and/or grooves are provided in at least one or more friction surfaces (54, 56) of the disks (34 through 40; 46 through 52) of the first and/or second disk sets (32; 42). A first type of recesses and/or grooves (68) is thereby provided, which is generated by a material shaping and/or a material casting and/or a non-material removing first manufacturing method, and a second type of recesses and/or grooves (70) is provided, which is generated by a material removing second manufacturing method. In addition, the
(Continued)

Figure 1:
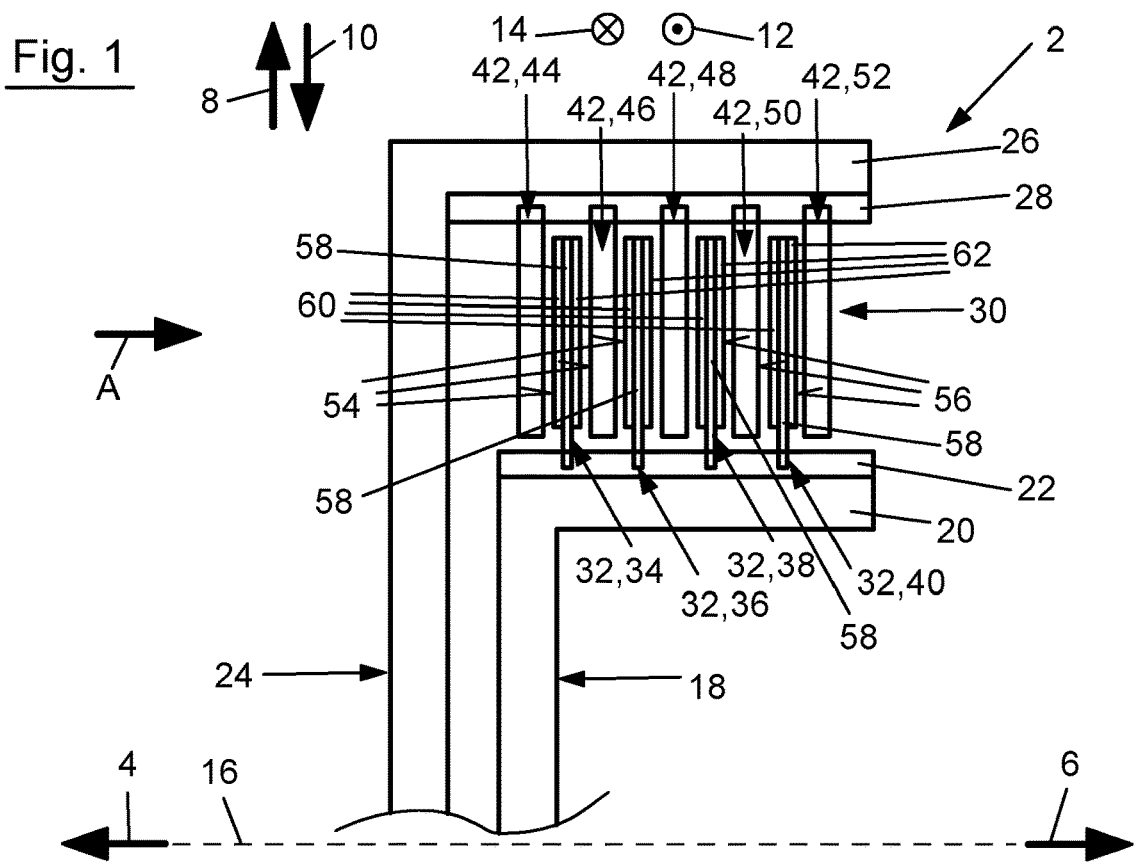

present invention relates to a disk (66) for such a disk clutch and a method for producing such a disk clutch (2) and such a disk (60).

15 Claims, 4 Drawing Sheets

(52) U.S. Cl.
CPC .............. *F16D 2250/003* (2013.01); *F16D 2250/0007* (2013.01); *F16D 2250/0069* (2013.01)

(56) References Cited

U.S. PATENT DOCUMENTS

| | | | | |
|---|---|---|---|---|
| 5,176,236 | A | * | 1/1993 | Ghidorzi ................ F16D 13/72 188/218 XL |
| 6,045,644 | A | | 4/2000 | Don et al. |
| 7,650,977 | B2 | | 1/2010 | Suzuki et al. |
| 2005/0284721 | A1 | | 12/2005 | Arcot et al. |
| 2006/0191768 | A1 | | 8/2006 | Epple et al. |
| 2013/0004717 | A1 | * | 1/2013 | Moch ...................... F16D 13/72 219/121.61 |
| 2013/0168199 | A1 | * | 7/2013 | Higashijima ........... F16D 13/60 192/107 M |
| 2014/0131160 | A1 | * | 5/2014 | Tsuda .................. F16D 27/115 192/66.3 |
| 2016/0298698 | A1 | * | 10/2016 | Merkel ................ F16D 13/648 |
| 2018/0216673 | A1 | | 8/2018 | Goetz |

\* cited by examiner

DISK CLUTCH, DISK FOR SUCH A DISK CLUTCH, METHOD FOR PRODUCING SUCH A DISK CLUTCH OR DISK

CROSS-REFERENCE TO RELATED APPLICATIONS

The present application is the National Stage of International Patent Application No. PCT/US2018/033180 filed on May 17, 2018, which claims priority to and all the benefits of German Application No. 102017004805.3 filed on May 19, 2017 and German Application No. 102018001877.7 filed on Mar. 8, 2018, which are hereby expressly incorporated herein by reference in their entirety.

The present invention relates to a disk clutch with a first disk set which is connected rotationally fixed to a first disk carrier, and a second disk set which is connected rotationally fixed to a second disk carrier, wherein the disks of the two disk sets may be brought into frictional engagement with one another via friction surfaces, wherein depressions and/or grooves are provided in at least one or more friction surfaces of the disks of the first and/or second disk set. Furthermore, the present invention relates to a disk with a friction surface in which depressions and/or grooves are provided. In addition, the present invention relates to a method for producing such a disk clutch or disk.

Disk clutches, in particular, wet-running disk clutches are known from practice. Thus, the known disk clutches have a first disk set which is connected rotationally fixed to a first disk carrier, and a second disk set which is connected rotationally fixed to a second disk carrier. The disks of the two disk sets are generally arranged alternating one behind the other, so that they may be brought into frictional engagement with one another via the friction surfaces facing one another. In wet-running disk clutches, a so-called drag torque occurs when the clutch is open, which is traced back to a fluid, for example, coolant or lubricant, flowing between the friction surfaces, and which should be as low as possible. In addition, the coefficient of friction acting when the clutch is closed is decisive for the frictional behavior and operating behavior of the disk clutch. To influence both, in particular to reduce the drag torque, recesses and/or grooves are provided in at least one or more friction surfaces of the disks of the first and/or second disk set. One thereby attempts to influence or to optimally adjust, in particular, the drag torque and the coefficient of friction using a specific dimensioning and shapes of the recesses and/or grooves. The durability of the individual disks should also be increased by the corresponding dimensioning and shaping of the recesses and/or grooves within the friction surfaces. However, it has been demonstrated that the listed features are only influenced to a limited extent solely be the dimensioning and/or shaping of the recesses and/or grooves within the friction surfaces.

It is therefore one object of the present invention to refine a disk clutch of the type in question in such a way that regardless of the respective shape or dimensioning of the recesses and/or grooves within the friction surfaces, the coefficient of friction and the drag torque may be influenced or adjusted in a targeted way. Furthermore, the underlying object of the present invention is to create an advantageous disk for such a disk clutch. In addition, one object of the present invention comprises specifying an advantageous method for producing such a disk clutch and such a disk.

This problem is solved by the features listed in Patent Claims 1, 8, 9, or 10. Advantageous embodiments of the invention are the subject matter of the subclaims.

The disk clutch according to the invention is preferably a wet-running disk clutch, particularly preferably designed as a hydraulically actuatable disk clutch. The disk clutch has a first disk set, for example, a set made from outer disks or inner disks, which is connected rotationally fixed to a first disk carrier, for example, an outer or inner disk carrier. In addition, the disk clutch has a second disk set, for example a set made from inner or outer disks, which is connected rotationally fixed to a second disk carrier, for example, an inner or outer disk carrier. The disks are preferably arranged displaceably on the respective disk carrier, wherein the disks particularly preferably follow one another alternatingly in the axial direction. In each case, the disks are arranged in such a way that the disks of the two disk sets may be brought into frictional engagement with one another via their friction surfaces. Recesses and/or grooves are provided in at least one or more friction surfaces of the disks of the first and/or second disk set. Thus, the recesses and/or grooves may be provided, for example, merely in the disks of one of the disk sets, while no recesses and/or grooves may be provided in the friction surfaces of the other disk set. However, it is likewise possible to provide corresponding recesses and/or grooves in the friction surfaces of the disks of the first disk set and also in the friction surfaces of the second disk set. The latter is particularly advantages for disks of the first and second disk set that are each provided with a friction lining on one side. The recesses and/or grooves provided in at least one or more friction surfaces of the disks of the first and/or second disk set thereby comprise at least two different types of recesses and/or grooves. Thus, a first type of recesses and/or grooves is generated by a material shaping and/or a material casting and/or a non-material removing first manufacturing method, while a second type of recesses and/or grooves is generated by a material-removing second manufacturing method. It has been demonstrated that two disk sets, identical with respect to shape and dimensioning, may have achieved significantly different drag torques and coefficients of friction, and also different durabilities, if the ratio between the number of the first type of recesses and/or grooves and the number of the second type of recesses and/or grooves is varied. If, for example, the number of the first type of recesses and/or grooves is increased and the number of the second type of recesses and/or grooves is reduced, a reduced drag torque may be thereby achieved. This also has a positive effect on the durability of the disk clutch or its disks. If, in contrast, the number of the second type of recesses and/or grooves is increased while the number of the first type of recesses and/or grooves is reduced, then this leads to a higher coefficient of friction so that the friction ratio is improved. Consequently, a disk clutch is created whose coefficient of friction and drag torque is adjusted in a targeted way and, if necessary, is improved by recesses and/or grooves generated in different ways.

As previously mentioned, the first type of recesses and/or grooves is created by material shaping and/or material casting so that no material is removed. Thus, the material shaping or material casting might be carried out, for example, in the way in that a corresponding friction lining is already correspondingly shaped or cast on the respective disk. In one preferred embodiment of the disk clutch according to the invention, the first type of recesses and/or grooves is generated by stamping, particularly as this enables a fast and simple manufacturing of the first type of recesses and/or grooves, wherein the corresponding recesses and/or grooves may be additionally manufactured particularly exactly and without major post-processing. In the case of one of the friction linings forming the friction surface, the stamping may additionally be carried out simultaneously with the application of the friction lining on the disk.

As already previously explained, the second type of recesses and/or grooves is generated by a material-removing second manufacturing method. Manufacturing methods may also be included in which the material is removed in chemical ways. However, in order to provide particularly exactly shaped and dimensioned recesses and/or grooves of the second type, which implement the desired operating behavior in a targeted way, the second type of recesses and/or grooves is generated by a mechanical manufacturing method in another preferred embodiment of the disk clutch according to the invention. Thus, the second type of recesses and/or grooves may be generated, for example, by grinding, wherein it is particularly preferred in this embodiment if the second type of recesses and/or grooves is generated by milling.

In one advantageous embodiment of the disk clutch according to the invention, the first type of recesses and/or grooves has a lesser depth than the second type of recesses and/or grooves. It has been demonstrated that by this means the durability of the entire disk clutch may be increased, particularly as the first type of recesses and/or grooves generated by material shaping may lead to an earlier component failure than is the case in the second type of recesses and/or grooves, with a corresponding depth, which had been generated by a material-removing second manufacturing method. This occurs, in particular, if the corresponding friction surface is formed by a friction lining which, due to the substantial material shaping, tends to detach from the disk or from a friction lining carrier of the disk.

In another advantageous embodiment of the disk clutch according to the invention, the friction surface or the multiple friction surfaces is/are formed by a friction lining fixed on a friction lining carrier. The friction lining is preferably a paper friction lining. In this context, it has proven advantageous if the friction lining is glued to the friction lining carrier. In particular, the paper friction lining may be processed relatively easy by both the first manufacturing method and also by the second manufacturing method, in order to create the first type of recesses and/or grooves and the second type of recesses and/or grooves so that the production of the disk clutch is significantly simplified.

In one particularly advantageous embodiment of the disk clutch according to the invention, the friction lining is fastened on the friction lining carrier in segments or glued on the friction lining carrier. This enables on the one hand a material-saving application of the friction lining, in particular of the paper friction lining. On the other hand, this enables the generation of an intermediate third type of recesses and/or grooves between the corresponding friction lining segments, so that this third type of recesses and/or grooves does not need to be generated by the listed first or second manufacturing methods. The segmented friction lining with the intermediate third type of recesses and/or grooves also enables that relatively simple grooves may be achieved with a maximum groove depth, particularly as the third type of recesses and/or grooves may be formed by the friction lining carrier itself. It is also preferred in this embodiment if the recesses and/or grooves of the third type extend from an inner edge to an outer edge of the friction surface.

In one particularly preferred embodiment of the disk clutch according to the invention, the disks of the first disk set are provided with friction surfaces comprising recesses and/or grooves on both sides, while the disks of the second disk set have friction surfaces that are not provided with recesses and/or grooves. Thus, the disks of the second disk set may be designed, for example as disks without friction linings or as steel disks. The disks of the first disk set may, in contrast, be designed as disks provided with friction linings on both sides.

In another advantageous embodiment of the disk clutch according to the invention, which presents an alternative to the previously described embodiment, both the disks of the first disk set and also the disks of the second disk set have a first friction surface with recesses and/or grooves and a second friction surface, facing away from the first friction surface, without recesses and/or grooves. Thus, disks of the first and second disk set may be, for example, disks provided on one side with a friction lining, wherein recesses and/or grooves are then preferably provided in the friction lining.

In another particularly advantageous embodiment of the disk clutch according to the invention, at least one of the disks has both the first type of recesses and/or grooves and also the second type of recesses and/or grooves. This simplifies the assembly of the disk clutch, particularly as one no longer needs to distinguished between disks, which only have the first type of recesses and/or grooves, and disks, which only have the second type of recesses and/or grooves, particularly as these would otherwise be distinguishable only with difficulty due to the same shape and dimensioning of the recesses and/or grooves.

Based on the previously described embodiment, in another advantageous embodiment of the disk clutch according to the invention, both the first type of recesses and/or grooves and also the second type of recesses and/or grooves are provided in one or both friction surfaces of this at least one disk. The two friction surfaces designate in this case preferably the friction surfaces provided on sides of a disk facing away from one another.

Alternatively to the two previously described embodiments, in another preferred embodiment of the disk clutch according to the invention, at least one of the disks has the first type of recesses and/or grooves, however, not the second type of recesses and/or grooves, while at least one other of the disks has the second type of recesses and/or grooves, however, not the first type of recesses and/or grooves. Since the first type of recesses and/or grooves and the second type of recesses and/or grooves are generated through fundamentally different manufacturing methods, the manufacturing of the disks for the disk clutch is hereby simplified, particularly as the disks with the first type of recesses and/or grooves and the disks with the second type of recesses and/or grooves may be manufactured simultaneously and/or separately from one another, for example, at different processing stations.

The disk according to the invention is conceived of for use in a disk clutch, in particular for use in one embodiment according to the invention of the disk clutch. Thus, the disk has at least one friction surface. Preferably, two friction surfaces are thereby provided which are formed on sides of the disk facing away from one another. In the at least one friction surface, a first type of recesses and/or grooves is provided, which are generated by a material shaping and/or a material casting and/or a non-material removing first manufacturing method, and a second type of recesses and/or grooves is provided, which are generated by a material removing second manufacturing method, preferably a mechanical manufacturing method, particularly preferably milling. With respect to the advantages and other embodiment variants of the disk, reference is made to the previously described advantages and embodiment variants of the disk clutch, which apply to the disk according to the invention in a corresponding way.

The method according to the invention for manufacturing a disk clutch, preferably a disk clutch of the previously described type according to the invention, has the method steps subsequently described in greater detail. Thus, the disks are initially provided. The disks are preferably disks of a first disk set connectable to a first disk carrier and of a second disk set connectable to a second disk carrier, wherein the two disk carriers form the disk carriers assigned to one another of an individual disk clutch. Thus, the disks of the first disk set may be, for example, outer or inner disks, while the disks of the second disk set may be, in contrast, inner or outer disks. Subsequently, a first type of recesses and/or grooves are generated in the friction surface of at least one of the disks by a material shaping or material casting and/or non-material removing first manufacturing method. In addition, a second type of recesses and/or grooves is generated in the friction surface of the same disk and/or in the friction surface of at least one other disk by a material-removing second manufacturing method, preferably by a mechanical manufacturing method, particularly preferably by milling. After the generation of the first and second type of recesses and/or grooves in the corresponding friction surface, a disk set is compiled from the disks, wherein the disks also comprise disks having the grooves and/or recesses. Consequently, a disk set is created which may be connected to the disk carriers of a disk clutch to easily produce the disk clutch.

In one advantageous embodiment of the method according to the invention, the disks of the first disk set are connected to a first disk carrier in such a way, and the disks of the second disk set are connected to a second disk carrier of the disk clutch in such a way, that their friction surfaces may be brought into frictional engagement with one another.

With respect to another embodiment variant of the method for producing the disk clutch, reference is made to the previously described embodiment variants of the disk clutch itself, from which additional embodiment variants of the method for producing the disk clutch arise clearly and easily for a person skilled in the art.

The method according to the invention for producing a disk has the method steps subsequently described in greater detail. Thus, initially a disk is provided with a friction surface, preferably with two friction surfaces on sides of the disk facing away from one another. Subsequently, a first type of recesses and/or grooves is generated in the at least one friction surface of the disk by a material shaping and/or material casting and/or non-material removing first manufacturing method. In addition, a second type of recesses and/or grooves is generated in the at least one friction surface of the disk by a material-removing second manufacturing method, preferably by a mechanical manufacturing method, particularly preferably by milling.

With respect to the advantages and other embodiment variants of the method according to the invention for producing the disk, reference is made to the previous description of the disk clutch and the disks of the type according to the invention, from which additional embodiment variants of the method for producing the disk arise clearly and easily for a person skilled in the art.

In one preferred embodiment of the method according to the invention for producing a disk, the provision of the disk comprises the provision of a friction lining carrier and the fixing of the friction lining, if necessary a paper friction lining, on the friction lining carrier to form the at least one friction surface. The fixing of the friction lining hereby preferably takes place by gluing.

In one particularly preferred embodiment of the method according to the invention for producing a disk, the fixing of the friction lining on the friction lining carrier is carried out simultaneously with the generation of the first type of recesses. Thus, the friction lining may be pressed against the friction lining carrier, for example, with the interposition of a glue, by means of a stamp or the like, while the stamp or the like has a predefined contour, which is impressed in the friction surface on the friction lining.

Figure 2:
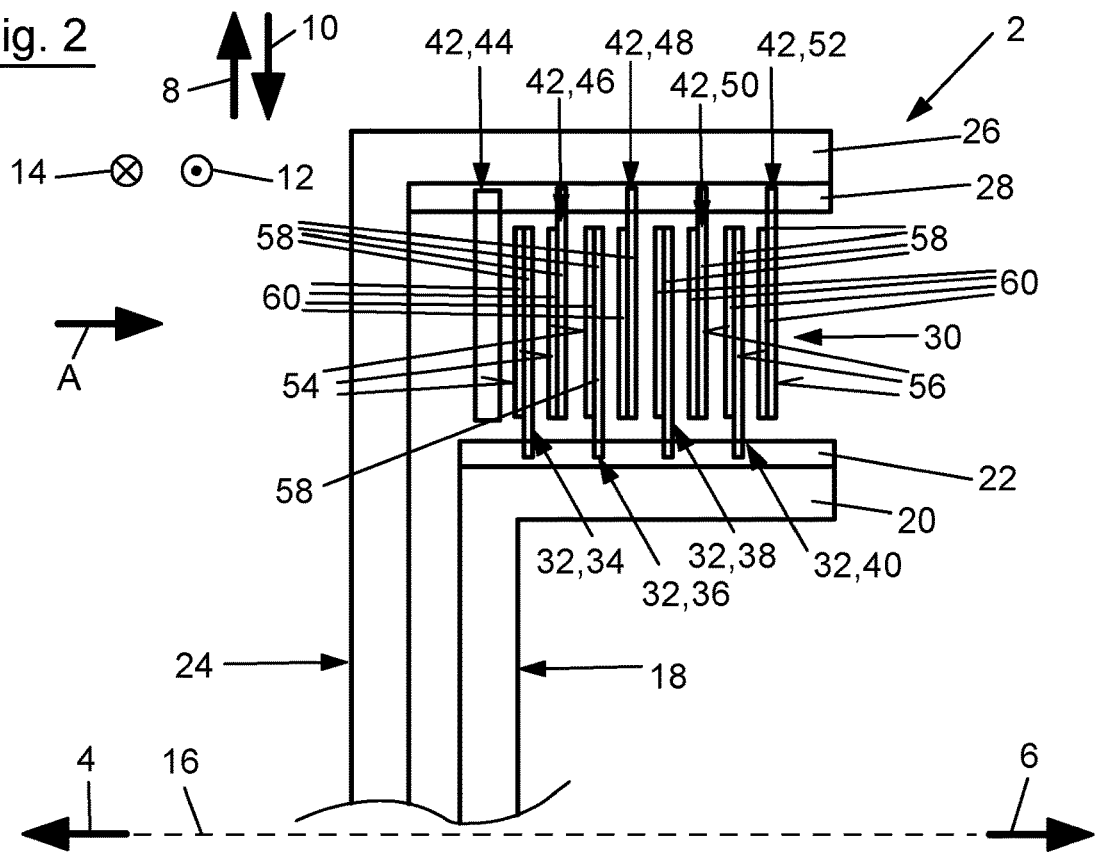
Figure 3:
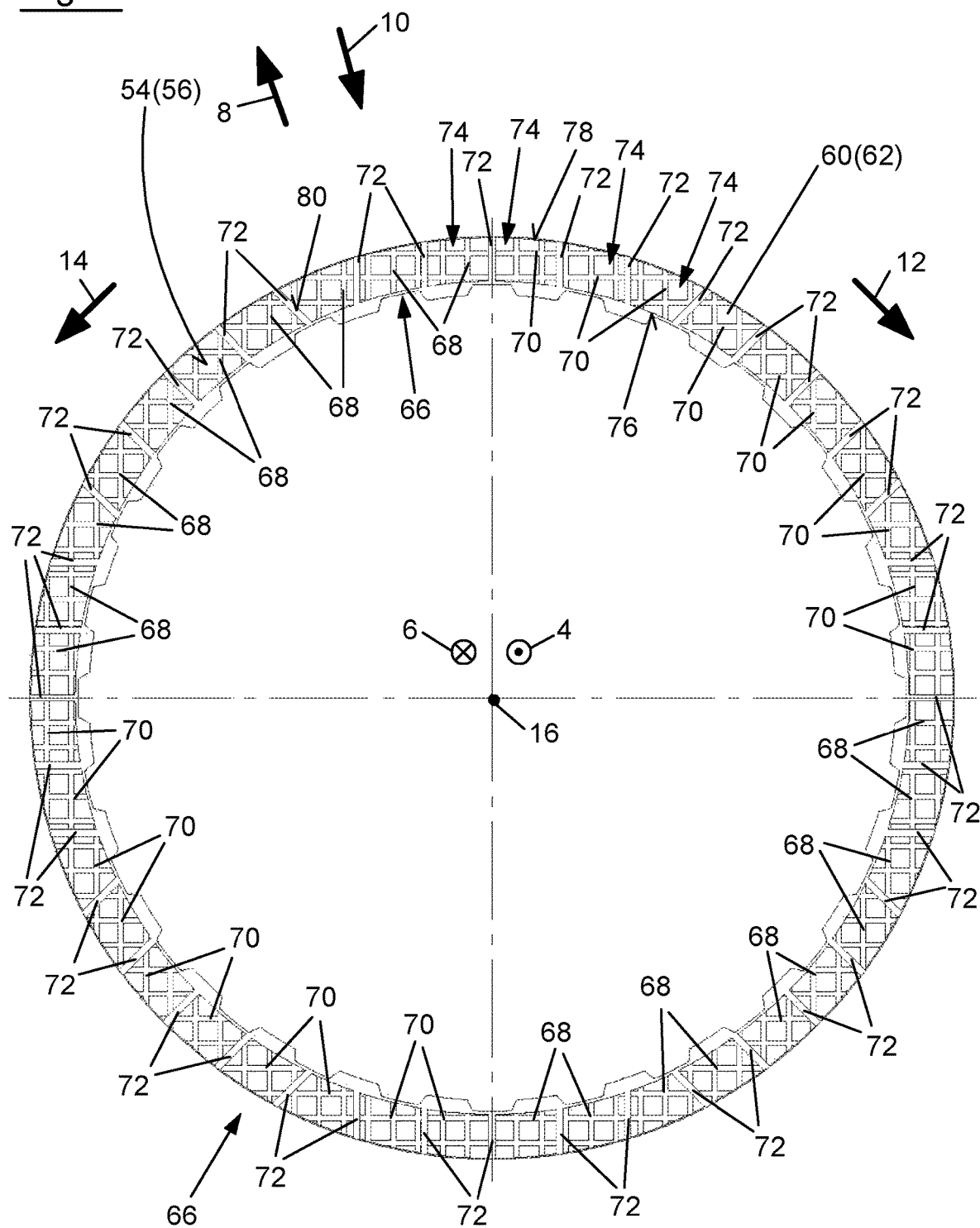
Figure 4:
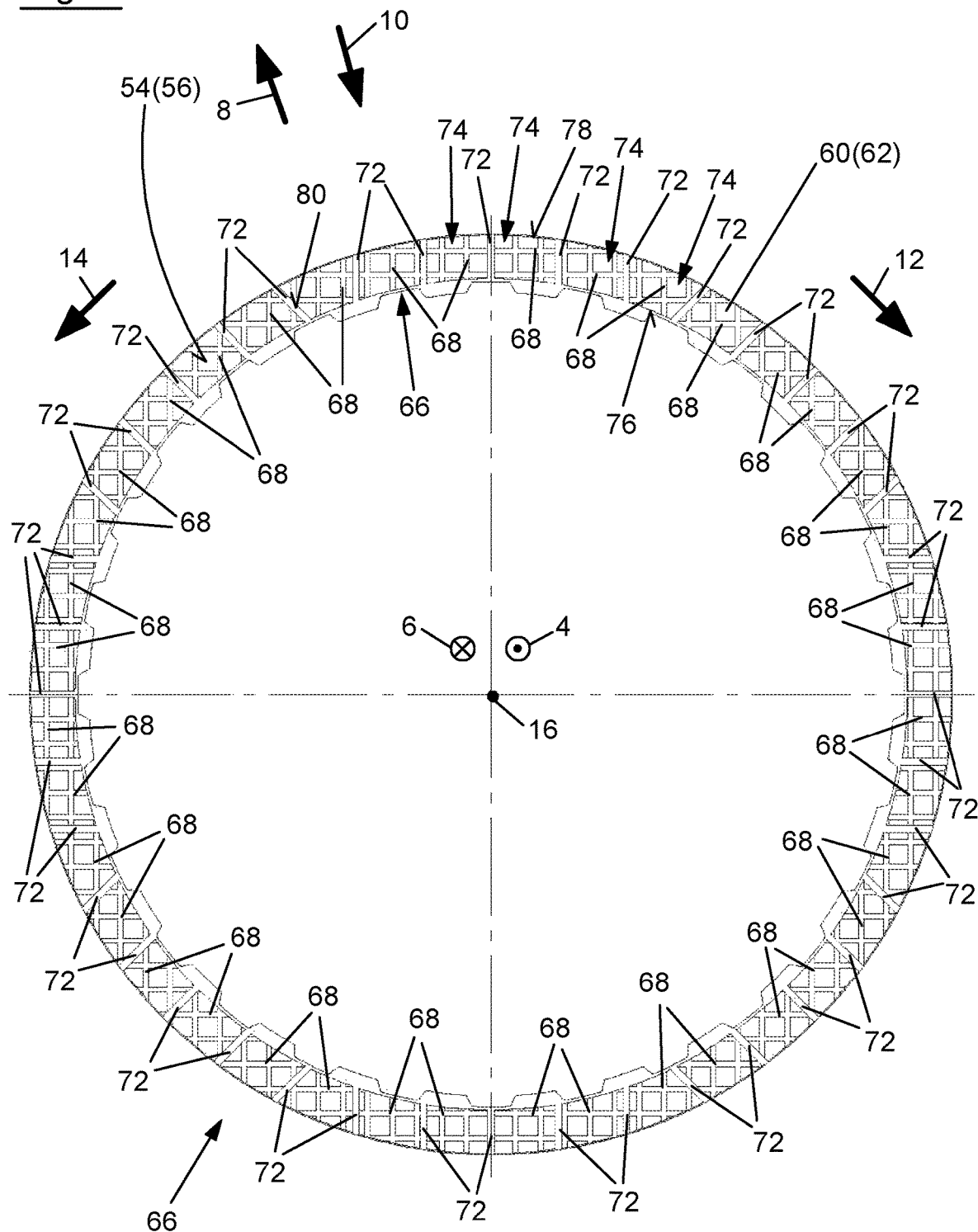
Figure 5:
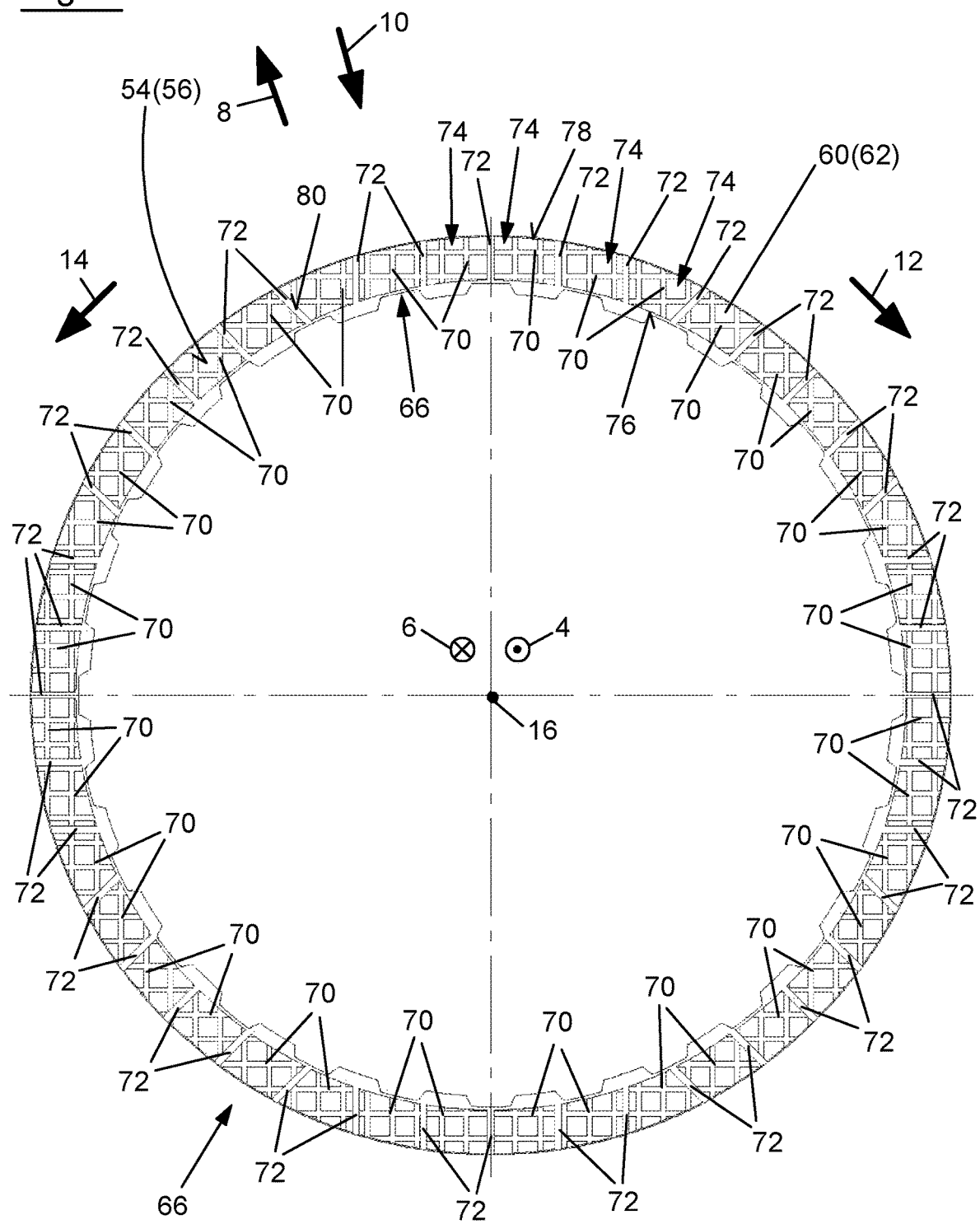

The invention will subsequently be explained in more detail by means of exemplary embodiments with reference to the accompanying drawings. As shown in:

FIG. 1 a partial side view of a disk clutch in a first embodiment in a cutaway view, FIG. 2 a partial side view of a disk clutch in a second embodiment in a cutaway view, FIG. 3 a front view of a first embodiment variant of a disk in the disk clutches according to FIGS. 1 and 2 in the direction of arrow A, FIG. 4 a front view of a second embodiment variant of a disk in the disk clutches according to FIGS. 1 and 2 in the direction of arrow A, and FIG. 5 a front view of a third embodiment variant of a disk in the disk clutches according to FIGS. 1 and 2.

FIG. 1 shows a disk clutch 2, which is designed as a wet-running disk clutch 2 and may be hydraulically actuated, even if a corresponding actuating piston or actuating element is omitted in the depiction in FIG. 1. In the figures, opposite axial directions 4, 6, opposite radial directions 8, 10, and opposite circumferential directions 12, 14 of disk clutch 2 are indicated by means of corresponding arrows, wherein disk clutch 2 is rotatable in circumferential directions 12, around axis of rotation 16 extending in axial directions 4, 6.

Disk clutch 2 has a first disk carrier 18, which is designed here as an inner disk carrier. First disk carrier 18 has a first disk carrier section 20 extending substantially in axial directions 4, 6, which is provided in radial direction 8 with a first rotary driving contour 22 facing outward and extending in circumferential direction 12, 14. A second disk carrier 24, which is additionally assigned to first disk carrier 18, is designed in this case as an outer disk carrier, and has a second disk carrier section 26, which likewise extends substantially in axial directions 4, 6, and is arranged nested with first disk carrier section 20 in radial direction 8, 10. Second disk carrier section 26 has a second rotary driving contour 28 extending in circumferential direction 12, 14 and facing inward in radial direction 10. The two rotary driving contours 22, 28 are preferably designed as toothings.

A disk set 30 is arranged in radial direction 8, 10 between two disk support sections 20, 26. Disk set 30 has a first disk set 32 whose disks 34 through 40 are designed as inner disks, which are connected rotationally fixed to first disk carrier section 20; however, are displaceable in axial direction 4, 6 relative to first disk carrier 18. In addition, disk set 30 has a second disk set 42, whose disks 44 through 52 are designed as outer disks and are connected rotationally fixed to second rotary driving contour 28, wherein disks 44 through 52 are displaceable in axial direction 4, 6 relative to second disk carrier 24. Disks 34 through 40 of first disk set 32 and disks 44 through 52 of second disk set 42 are arranged in such a way that they alternate one another in axial direction 4, 6. Thus the disks of both disk sets 32, 42 each have a first friction surface 54 facing in axial direction 4 and a second friction surface 56 facing in axial direction 6, wherein both friction surfaces 54, 56 are formed as friction surfaces 54, 56 extending substantially in circumferential direction 12, 14, which consequently may also be designated as substantially annular friction surfaces 54, 56. In addition, it should be noted that the two end disks, in this case disks 44 and 52, only have a friction surface 56 or a friction surface 54, particularly as the surface of disk 44 facing in axial direction 4 and the side of end disk 52 facing in axial direction 6 may not be brought into frictional engagement with another disk. In general, disks 34 through 40 of first disk set 32 and disks 44 through 52 of second disk set 42 may be brought into frictional engagement with one another via friction surfaces 54, 56 facing one another, when disk set 30 is pressed together or compressed in axial direction 4, 6.

In the embodiment according to FIG. 1, disks through 40 of first disk set 32 are designed as friction lining disks, stated more precisely, as disks 34 through 40 provided with a friction lining on both sides. Thus, disks 34 through 40 each have a substantially annular friction lining carrier 58, wherein a first friction lining 60 is fixed on the side of friction lining carrier 58 facing in axial direction 4 to form first friction surface 54, and a second friction lining 62 is fixed on the side of friction lining carrier 58 facing in axial direction 6, which serves to form second friction surface 56. The two friction linings 60, 62 are paper friction linings, which are additionally glued to friction lining carrier 58. Friction linings 60, 62 are thereby each fixed on friction lining carrier 58 as segments, wherein this shall be explained again later in greater detail. Disks 44 through 52 of second disk set 42 are, in contrast, designed as disks without friction linings and/or as steel disks. Recesses and/or grooves are provided in friction surfaces 54, 56 of disks 34 through 40 of first disk set 32, whereas no grooves and/or recesses are provided in the friction surfaces 54, 56 of disks 44 through 52 of second disk set 42.

Before the previously mentioned recesses and/or grooves in friction surfaces 54, 56 are explained in greater detail, the structure of the second embodiment of disk clutch 2 according to FIG. 2 should be explained. The second embodiment in FIG. 2 corresponds substantially with the embodiment according to FIG. 1, so that subsequently only the differences shall be addressed; identical reference numbers are used for identical or similar parts and the previous description correspondingly generally applies.

In contrast to the first embodiment, disks 34 through 40 of first disk set 32 have only the previously mentioned first friction lining 60, which functions to form first friction surface 54 facing in axial direction 4, whereas second friction surface 56 facing in axial direction 6 is itself formed by friction lining carrier 58. Disks 34 through 40 of first disk set 32 are consequently disks 34 through 40 provided with a friction lining 60 on one side. This applies correspondingly for disks 46 through 52 of second disk set 42, which are likewise formed as disks provided with a friction lining 62 on one side, consequently have a friction lining carrier 58 on whose side facing in axial direction 4 a friction lining 62 is fixed using the previously described way in order to form first friction surface 54, whereas second friction surface 56 of disks 44 through 50 facing in axial direction 5 is formed by friction lining carrier 58. However, end disk 44 may again be a disk without a friction lining or a steel disk, consequently the side of end disk 44 facing in axial direction 4 may not be brought into frictional engagement with a disk of first disk set 32. In the second embodiment according to FIG. 2, said recesses and/or grooves are consequently formed both in disks 34 through 40 of first disk set 32 and also in disks 46 through 52 of second disk set 42, wherein the recesses and/or grooves are always formed in first friction surface 54 formed by respective friction lining 62, whereas no grooves and/or recesses are provided in second friction surface 56.

Embodiment variants of the disks used in disk clutch 2 according to FIG. 1 and/or FIG. 2 are subsequently described with reference to FIGS. 3 through 5. In the case of disk clutch 2 according to FIG. 1, the structure of at least one or at least two disks of first disk set 32 are thereby described, wherein the embodiments may relate to both only first friction surface 54 or to both first friction surface 54 and also second friction surface 56 of disks 34 through 40 of first disk set 32. In the case of the second embodiment of disk clutch 2 according to FIG. 2, the subsequent embodiments relate to at least one or two of disks 34 through 40 of first disk set 32 and/or to at least one or two of disks 46 through 52 of second disk set 42. Reference is also made to the fact that, with respect to disk clutch 2 according to FIG. 2, FIGS. 3 through 5 namely show an inner disk; however the subsequent embodiments apply in a corresponding way for at least one of disks 46 through 52 of second disk set 42 with the single difference that, instead of the inner toothing shown in FIGS. 3 through 5, an outer toothing would be provided on each disk 46 through 52 in order to be able to bring these into rotary driving connection with second rotary driving contour 28 on second disk support section 26.

FIG. 3 shows a first embodiment of a disk 66, wherein at least one of disks 34 through 40 of first disk set 32 in FIG. 1 or at least one disk 34 through 40 of first disk set 32 and/or at least one of disks 46 through 52 in FIG. 2 is designed in the manner of disk 66. First friction surface 54 is formed by friction lining 60, which is fixed in the already previously described way on the side of friction lining carrier 58 facing in axial direction 4, wherein first friction surface 54 is designed as extending substantially in circumferential direction 12, 14. A first type of recesses and/or grooves 68 is provided in first friction surface 54. First type of recesses and/or grooves 68, which preferably form a groove pattern in a grid or honeycomb shape, was generated by a material shaping first manufacturing method, and thus not by a material removing manufacturing method. It is hereby preferred if first type of recesses and/or grooves 68 is generated by stamping. Thus, first type of recesses and/or grooves 68 may, for example, be generated simultaneously with the gluing of friction lining 60 to friction lining carrier 58; however, first type of recesses and/or grooves 68 might also have been stamped after friction lining 60 was fixed on friction lining carrier 58. Alternatively, the first manufacturing method may also be a material casting first manufacturing method, in which the provided friction lining 60 had already been provided with first type of recesses and/or grooves 68 during production of the same. In addition, first friction surface 54 has a second type of recesses and/or grooves 70. Second type of recesses and/or grooves 70 again form a groove pattern, which is formed as grid or honeycomb shaped and corresponds in its dimensioning substantially to the groove pattern of first type of recesses and/or grooves 68. First type of recesses and/or grooves 68 and second type of recesses and/or grooves 70 thereby follow one another alternatingly in circumferential direction 12, 14. Although it would, alternatively or supplementally, basically also be possible if first type of recesses and/or grooves 68 and second type of recesses and/or grooves 70 followed one another in radial direction 8, 10, the depicted embodiment has, however, the advantage of simplified production. Second type of recesses and/or grooves 70 is, in contrast to first type of recesses and/or grooves 68, generated by a material-removing second manufacturing method. This may basically be any material-removing manufacturing method; however, it is preferred if this is a mechanical manufacturing method, like grinding, wherein it is particularly preferred if second type of recesses and/or grooves 70 is generated by milling. Even if it is not obvious from FIG. 3, first type of recesses and/or grooves 68 have a lesser depth than second type of recesses and/or grooves 70.

In the case of disk clutch 2 according to FIG. 1, disks 34 through 40 of first disk set 32 are thus provided on both sides with friction surfaces 54 and 56 with first type of recesses and/or grooves 68 and second type of recesses and/or grooves 70, whereas disks 44 through 52 of second disk set 42 have no grooves and/or recesses in their friction surfaces 54, 56. In contrast, in the case of disk clutch 2 according to FIG. 2, at least one of disks 34 through 40 and 46 through 52 has first and second type of recesses and/or grooves 68, 70 in first friction surface 54, whereas no recesses and/or grooves are provided in second friction surface 56 facing away from first friction surface 54. It is also clear from the previous description of disk 66 according to FIG. 3, that at least one disk 34 through 40 and 46 through 52 has both first type of recesses and/or grooves 68 as well as second type of recesses and/or grooves 70, wherein in one or both friction surfaces 54, 56, both first type of recesses and/or grooves 68 as well as second type of recesses and/or grooves 70 are provided.

As already previously mentioned, friction lining 60 is fixed on friction lining carrier 58 in segments. This is carried out by generating an intermediate third type of recesses and/or grooves 72, which is formed between friction lining segments 74 of friction lining 60 and extends in the depicted embodiment from an inner edge 76 facing inward in radial direction 10 to an outer edge 78 facing outward in radial direction 8, wherein third type of recesses and/or grooves 72 is not only formed as continuous, but also has a groove bottom which is formed by friction lining carrier 58.

FIGS. 4 and 5 show two additional embodiment variants of a disk 66, which essentially correspond to the embodiment variant from FIG. 3, so that subsequently only the differences shall be addressed; identical reference numerals are used for identical or similar parts and the previous description correspondingly generally applies. Both embodiments according to FIGS. 4 and 5 are used according to another embodiment of disk clutch 2 both in the embodiment according to FIG. 1 as well as the embodiment according to FIG. 2. This means for disk clutch 2 according to FIG. 1, that at least one of disks 34 through 40 is designed in the manner of disk 66 from FIG. 4, whereas another of disks 34 through 40 from FIG. 1 is designed in the manner of disk 66 from FIG. 5. In the case of disk clutch 2 according to FIG. 2, at least one of disks 34 through 40 and 46 through 52 is designed in the manner of disk 66 from FIG. 4, and at least one of disks 34 through 40 and 46 through 52 is designed in the manner of disk 66 from FIG. 5.

In contrast to disk 66 according to FIG. 3, in disk 66 according to FIG. 4, only first type of recesses and/or grooves 68 is provided, whereas second type of recesses and/or grooves 70 is not provided. In contrast, in disk 66 according to FIG. 5, only second type of recesses and/or grooves 70 is provided, whereas first type of recesses and/or grooves 68 is not provided. This has the advantage for disk 66 according to FIG. 4, that disk 66 or recesses and/or grooves 68 provided therein of the first type need only be manufactured by the material shaping first manufacturing method, whereas the advantage exists for disk 66 according to FIG. 5, that this disk or recesses and/or grooves 70 of the second type provided therein may be generated solely by the material-removing second manufacturing method, so that disk 66 according to FIG. 4 and disk 66 according to FIG. 5 may be manufactured separately from one another, yet simultaneously on different processing stations.

The method for producing disk clutch 2 from FIGS. 1 and 2 already arises from the previous description of FIGS. 1 through 5, so that the corresponding production method is to be only briefly explained again in the following.

In the context of the production method, initially disks 34 through 40 of first disk set 32 and disks 44 through 52 of second disk set 42 are provided. In the case of disks 34 through 40 of first disk set 32 according to FIG. 1, and also in the case of disks 34 through 40 and 46 through 52 of both disk sets 32, 42 according to FIG. 2, the provision of the same is carried out by providing the respective friction lining carrier 58 and fixing the friction linings 60, 62 in the form of paper friction linings on friction lining carrier 58 while forming corresponding friction surfaces 54, 56. Furthermore, first type of recesses and/or grooves 68 are generated in the friction surface of at least one of the disks by a material shaping and/or material casting and/or non-material removing first manufacturing method, preferably by stamping. It is hereby preferred if the fixing or gluing is carried out simultaneously with the generation of first type of recesses and/or grooves 68. In addition, second type of recesses and/or grooves 70 is generated in the respective friction surface of the at least one disk and/or in the friction surface of at least one other disk by a material-removing second manufacturing method, preferably by a mechanical manufacturing method, particularly preferably by milling.

Subsequently, disk set 30 is compiled from the disks, including the disks having grooves and/or recesses, as this is depicted in FIG. 1 or FIG. 2 in conjunction with FIGS. 3 through 5. Thus, disks 34 through 40 of first disk set 32 are connected to first disk carrier 18 in such a way, and disks 44 through 52 of second disk set 42 are connected to second disk carrier 24 in such a way, that friction surfaces 54 and 56 may be brought into frictional engagement with one another.

REFERENCE SIGN LIST

2 Disk clutch
4 Axial direction
6 Axial direction
8 Radial direction
10 Radial direction
12 Circumferential direction
14 Circumferential direction
16 Axis of rotation
18 First disk carrier
20 First disk support section
22 First rotary driving contour
24 Second disk carrier
26 Second disk support section
28 Second rotary driving contour
30 Disk set
32 First disk set
34 Disk
36 Disk
38 Disk
40 Disk
42 Second disk set
44 Disk
46 Disk
48 Disk
50 Disk 52 Disk
54 First friction surface
56 Second friction surface
58 Friction lining carrier
60 First friction lining
62 Second friction lining
66 Disk
68 First type of recesses and/or grooves
70 Second type of recesses and/or grooves
72 Third type of recesses and/or grooves
74 Friction lining segment
76 Inner edge
78 Outer edge

The invention claimed is:

1. A disk clutch (2), comprising a first disk set (32) which is connected rotationally fixed to a first disk carrier (18) and a second disk set (42) which is connected rotationally fixed to a second disk carrier (24), wherein disks (34 through 40, 46 through 52) of the two disk sets (32, 42) are configured to be brought into frictional engagement with one another via friction surfaces (54, 56), wherein recesses and/or grooves are provided in at least one or more friction surfaces (54, 56) of the disks (34 through 40; 46 through 52) of the first and/or second disk sets (32; 42), wherein a first type of recesses and/or grooves (68) is provided, which is generated by a material shaping and/or a material casting and/or a non-material removing first manufacturing method, and a second type of recesses and/or grooves (70) is provided, which is generated by a material removing second manufacturing method, wherein the at least one friction surface (54, 56) or the multiple friction surfaces (54, 56) is/are formed by a friction lining (60, 62) fixed on a friction lining carrier (58), and wherein the friction lining (60, 62) is glued on the friction lining carrier (58), or is fixed on the friction lining carrier (58) in segments, while generating an intermediate third type of recesses and/or grooves (72).

2. The disk clutch (2) according to claim 1, wherein the first type of recesses and/or grooves (68) is generated by stamping and/or the second type of recesses and/or grooves (70) is generated by a mechanical manufacturing method.

3. The disk clutch (2) according to claim 2, wherein the mechanical manufacturing method is milling.

4. The disk clutch (2) according to claim 1, wherein the first type of recesses and/or grooves (68) have a lesser depth than the second type of recesses and/or grooves (70).

5. The disk clutch (2) according to claim 1, wherein the disks (34 through 40) of the first disk set (32) are provided on both sides with the friction surfaces (54, 56) with the recesses and/or grooves (68, 70), whereas the disks (44, through 52) of the second disk set (42) have no friction surfaces (54, 56) provided with recesses and/or grooves.

6. The disk clutch (2) according to claim 1, wherein at least one of the disks (34 through 40, 44 through 52) has both the first type of recesses and/or grooves (68) as well as the second type of recesses and/or grooves (70).

7. The disk clutch (2) according to claim 6, wherein both the first type of recesses and/or grooves (68) as well as the second type of recesses and/or grooves (70) are provided in one or both friction surfaces (54; 56) of this at least one disk (34 through 40, 44 through 52).

8. A method for producing the disk clutch (2) according to claim 1, comprising the method steps:
providing the disks (34 through 40, 44 through 52) of the first disk set (32) connectable to the first disk carrier (18) and of the second disk set (42) connectable to the second disk carrier (24),
generating the first type of recesses and/or grooves (68) by the material shaping and/or the material casting and/or the non-material removing first manufacturing method in the friction surfaces (54; 56) of at least one of the disks (34 through 40, 44 through 52),
generating the second type of recesses and/or grooves (70) by the material removing second manufacturing method in the friction surfaces (54; 56) of the at least one disk (34 through 40, 46 through 52), and/or in the friction surfaces (54; 56) of at least one other disk (34 through 40, 44 through 52), and
compiling a disk set (30) from the disks, including the disks (34 through 40; 44 through 52) having the grooves and/or recesses.

9. The disk clutch (2) according to claim 1, wherein the disk clutch (2) is a hydraulically actuatable disk clutch (2).

10. The method for producing a disk clutch (2) according to claim 8, wherein the disks (34 through 40) of the first disk set (32) are connected to a first disk carrier (18) in such a way, and the disks (44 through 52) of the second disk set (42) are connected to a second disk carrier (24) in such a way that their friction surfaces (54, 56) may be brought into frictional engagement with one another.

11. The method for producing the disk clutch (2) according to claim 10, wherein the providing of the disks (34 through 40, 44 through 52) of the second disk set (42) comprises providing a friction lining carrier (58) and fixing of a friction lining (60, 62) on the friction lining carrier (58) to form the at least one friction surface (54; 56).

12. The method for producing the disk clutch (2) according to claim 11, wherein the fixing is carried out simultaneously with the generation of the first type of recesses and/or grooves (68).

13. The disk clutch (2) according to claim 1, wherein the friction lining carrier (58) is a paper friction lining.

14. The disk clutch (2) according to claim 1, wherein the friction lining (60, 62) is glued on the friction lining carrier (58), or is fixed on the friction lining carrier (58) in segments.

15. The disk clutch (2) according to claim 1, wherein the disks (34 through 40, 44 through 52) of the first and second disk sets (32, 42) each have a first friction surface (54) with the recesses and/or grooves (68, 70) and a second friction surface (56) facing away from the first friction surface (54) without recesses and/or grooves.

* * * * *

UNITED STATES PATENT AND TRADEMARK OFFICE
CERTIFICATE OF CORRECTION

| | |
|---|---|
| PATENT NO. | : 11,359,679 B2 |
| APPLICATION NO. | : 16/614477 |
| DATED | : June 14, 2022 |
| INVENTOR(S) | : Michael Wilhelm Schaefer |

It is certified that error appears in the above-identified patent and that said Letters Patent is hereby corrected as shown below:

In the Claims

Claim 11, Column 12, Line 34, please delete "to claim 10, wherein the providing" and replace with
-- to claim 9, wherein the providing --

Signed and Sealed this
Nineteenth Day of July, 2022

Katherine Kelly Vidal
*Director of the United States Patent and Trademark Office*